Patented Oct. 28, 1952

2,615,804

UNITED STATES PATENT OFFICE 2,615,804

HERBICIDAL COMPOSITION

William D. Stewart and John H. Standen, Yonkers, N. Y., assignors to The B. F. Goodrich Company, New York, N. Y., a corporation of New York No Drawing. Application May 8, 1947, Serial No. 746,862

4 Claims. (Cl. 71—2.7)

This invention relates to herbicidal compositions and more specifically pertains to the use of bis-alkylxanthogens and bis-alkylthioxanthogens as the toxic ingredients in horticultural compositions which are exceedingly effective as herbicides.

We have discovered that bis-alkylxanthogens and bis-alkylthioxanthogens having the generic formula

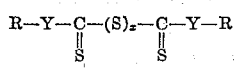

$$R-Y-\underset{\underset{S}{\parallel}}{C}-(S)_x-\underset{\underset{S}{\parallel}}{C}-Y-R$$

where R is an alkyl hydrocarbon radical, Y is oxygen or sulphur and $x$ is an integer greater than 1, but less than 5, are excellent herbicidal compositions being effective in solutions or aqueous emulsions containing as little as only 0.5% by weight of said xanthogens or thioxanthogens. These compositions have been used against the plant life usually found in driveways, tennis courts, roadsides, vacant lots, drainage ditches, barn lots, etc. as for example crab-grass, foxtail, ragweed, lamb's-quarters, oxalis, quack grass, plantain, burdock, Japanese honeysuckle, dandelion, shepherd's purse, poison ivy, Canadian thistles, and bindweed, with much success. In fact all plant life can be successfully destroyed by the use of these chemical compounds as hereinafter described.

As an example of the bis-alkylxanthogens and bis-alkylthioxanthogens, which are useful according to our invention, there are, among others, where in the above formula Y is oxygen and $x$ is 2, such compounds as bis-ethylxanthogen, bis-n-propylxanthogen, bis-isopropylxanthogen, and bis-methylxanthogen; where Y is sulphur and $x$ is 2, such compounds as bis-ethylthioxanthogen, bis-n-propylthioxanthogen, bis-isopropylthioxanthogen, and bis-methylthioxanthogen; where Y is oxygen and $x$ is 4, such compounds as bis-ethylxanthogen disulfide, bis-n-propylxanthogen disulfide, bis-isopropylxanthogen disulfide, bis-methylxanthogen disulfide, bis-cyclohexylxanthogen disulfide and bis-benzylxanthogen disulfide; and where Y is sulphur and $x$ is 4, such compounds as bis-ethylthioxanthogen disulfide, bis-n-propylthioxanthogen disulfide, bis-isopropylthioxanthogen disulfide, bis-methylthioxanthogen disulfide, bis-cyclohexylthioxanthogen disulfide and bis-benzylthioxanthogen disulfide.

The following examples illustrate the effectiveness of the bis-alkylxanthogens and bis-alkylthioxanthogens as destroyers of plant life.

Example I

A plot of mixed weeds and grasses about 10 feet square, consisting mainly of quack grass, plantain and dandelion, was sprayed with a composition made up by dissolving 0.09 part by weight of bis-isopropylxanthogen in 1.75 parts by weight of a refined deodorized kerosene and dispersing this solution in 16.5 parts by weight of water with 0.18 part of a mixture of sodium salts of the sulfated fatty alcohols having 10 to 18 carbon atoms sold under the name of Aquarex D. It was observed that all the quack grass and 80% of the other grasses were dead five to seven days after treatment.

Example II

Another plot of weeds and grasses containing predominantly the same type of weeds as were in the plot treated in Example I, was sprayed with an aqueous emulsion containing 1% by weight of bis-isopropylxanthogen and about 0.125% by weight of the mixed sodium salts of sulfated fatty alcohols having 10 to 18 carbon atoms sold under the name of Aquarex D was used as an emulsifying agent. It was observed, five to seven days after treatment, that most all of the plant life was dead.

Example III

A heavy growth of Japanese honeysuckle was sprayed with a solution containing 5% of bis-isopropylxanthogen dissolved in an insecticide grade of refined kerosene. A similar patch of Japanese honeysuckle was sprayed with an aqueous emulsion containing 5% bis-isopropylxanthogen emulsified with 0.3% of Aquarex D. It was observed that the foliage and stems of the plants blackened in about five days and that all the plants were dead in seven days. In about fourteen days a new crop of Japanese honeysuckle had begun to show, but these new plants died within a few days. This residual effect was probably due to a delayed action on the underground plant system rather than a resulting soil sterility, for other plants that had not been present when the herbicidal compositions were applied had started and continued to grow.

Example IV

A portion of a plot of an accumulation of weed growth on the edge of a field along a fence row was sprayed with a 5% solution of bis-isopropylxanthogen dissolved in an insecticide grade of refined kerosene. Another portion was sprayed with an aqueous emulsion containing 1% of bis-isopropylxanthogen. The accumulation of weeds included such commonly found weeds as crabgrass, foxtails, ragweed, lamb's-quarters, oxalis, quack grass, plantain, burdock, Japanese honeysuckle, dandelion, shepherd's purse, poison ivy, Canadian thistle and bindweed. In each weed plot sprayed, the kill of the plants was complete in seven days, and even after fourteen days it was noted that regrowth of the plants was nearly completely retarded.

When solutions and aqueous emulsions of bis-ethylxanthogen disulfide were employed in plant destroying compositions in substantially the same tests as described above, the results were found to be essentially the same.

The other bis-alkylxanthogens and bis-alkylxanthogen disulfides as well as the bis-alkylthioxanthogens and bis-alkylthioxanthogen disulfides enumerated above may be used in the same manner as described in the above specific examples with about the same results.

As hereinbefore illustrated, aqueous emulsions and dispersions of bis-alkylxanthogens and bis-alkylthioxanthogens prepared without the use of dispersing or wetting agents are equally as effective as those prepared with wetting or dispersing agents. In all probability the use of aqueous emulsions or dispersions would be preferred for large scale application on highway berms, unpaved roads and driveways, tennis courts, drainage ditches, barnyard lots, etc. For these purposes, aqueous dispersions of bis-alkylxanthogens and bis-alkylthioxanthogens may be prepared with such dispersing or wetting agents as, for example, those typified by the following general classifications: sodium and potassium salts of fatty acids known as soft and hard soaps; salts of disproportionated abietic acid known as rosin soaps; salts of the hydroxy aldehyde acids present in seaweed known as algin soaps; alkali-casein compositions; water-soluble lignin sulfonate salts; long chain alcohols usually containing 10 to 18 carbon atoms; water-soluble salts of sulfated fatty alcohols containing 10 to 18 carbon atoms; water-soluble salts of sulfated fatty acid amides; water-soluble esters of sulfated fatty acids; water-soluble alkyl sulfonates having on the average of 16 carbon atoms in the alkyl group; water-soluble aryl sulfonates; water-soluble alkyl aryl sulfonates; water-soluble aralkyl sulfonates; water-soluble sorbitan mono-laurate, -palmitate, -stearate, and -oleate; and others. These dispersing and wetting agents are sold under numerous trade names and may be either pure compounds or be mixtures of compounds of the same general group.

When a wetting or dispersing agent is employed to disperse or emulsify the bis-alkylxanthogen or bis-alkylthioxanthogen, it will be usually necessary to use aqueous solutions containing only from about ⅛% to about 5% of the wetting or dispersing agent to prepare compositions containing from about 0.05% to about 5% of these herbicidal compositions.

Although the use of the preferred concentrations of .05% to about 5% of these herbicidal materials has been described in the specific examples, the disclosure of these specific quantities is not intended as a limitation of the use of these materials, for it will be readily understood that higher concentrations can be employed if desired, but by employing such compositions containing more than 5% of the xanthogens and thioxanthogens, the final results would be no different, while the cost of application would be increased beyond that considered economically sound.

While we have disclosed specific examples of our invention, we do not desire or intend to limit ourselves solely thereto for as hitherto stated, other equivalent chemical compounds can be employed, and the proportions of the active ingredients may be varied if desired without departing from the spirit and scope of our invention as defined in the appended claims.

We claim:

1. A method of killing plant life which comprises uniformly applying to the foliage of living plants a composition containing as the essential active ingredient from about 0.05% to about 5% by weight of bis-isopropylxanthogen having the formula:

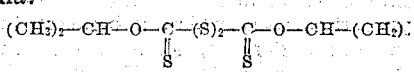

2. A method of killing plant life in an area which comprises spraying the areas to be treated with a composition comprising as the essential active ingredient from about 0.05% to about 5% by weight of bis-isopropylxanthogen having the formula

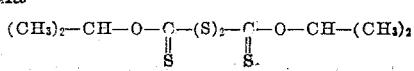

dissolved in an insecticide grade kerosene.

3. A method of killing plant life in an area which comprises spraying the area to be treated with a composition comprising as the essential active ingredient from about 0.05% to about 5% by weight of bis-isopropylxanthogen having the formula

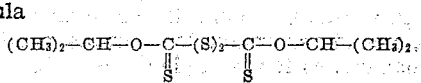

emulsified in an aqueous medium.

4. A method of killing plant life which comprises uniformly applying to the foliage of living plants a lethal concentration of bis-isopropyl xanthogen having the formula:

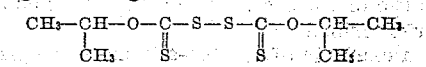

WILLIAM D. STEWART.
JOHN H. STANDEN.

REFERENCES CITED

The following references are of record in the file of this patent:

UNITED STATES PATENTS

| Number | Name | Date |
| --- | --- | --- |
| 2,250,545 | Mikeska | July 29, 1941 |
| 2,392,859 | Meuli | Jan. 15, 1946 |
| 2,430,332 | Guy | Nov. 4, 1947 |
| 2,431,010 | Zimmer | Nov. 18, 1947 |

OTHER REFERENCES

Roark et al., "List of Organic S Compounds Used as Insecticides;" U. S. Dept. of Agr. Bur. of Entom. and Plant Quar., Div. of Insect Invest., E-344, pages 78, 79, May 1935.